March 20, 1962  L. E. FISHER  3,026,396
BUSWAY SWITCH
Filed Sept. 24, 1958  3 Sheets-Sheet 1

INVENTOR.
LAWRENCE E. FISHER
BY Robert F. Casey
ATTORNEY

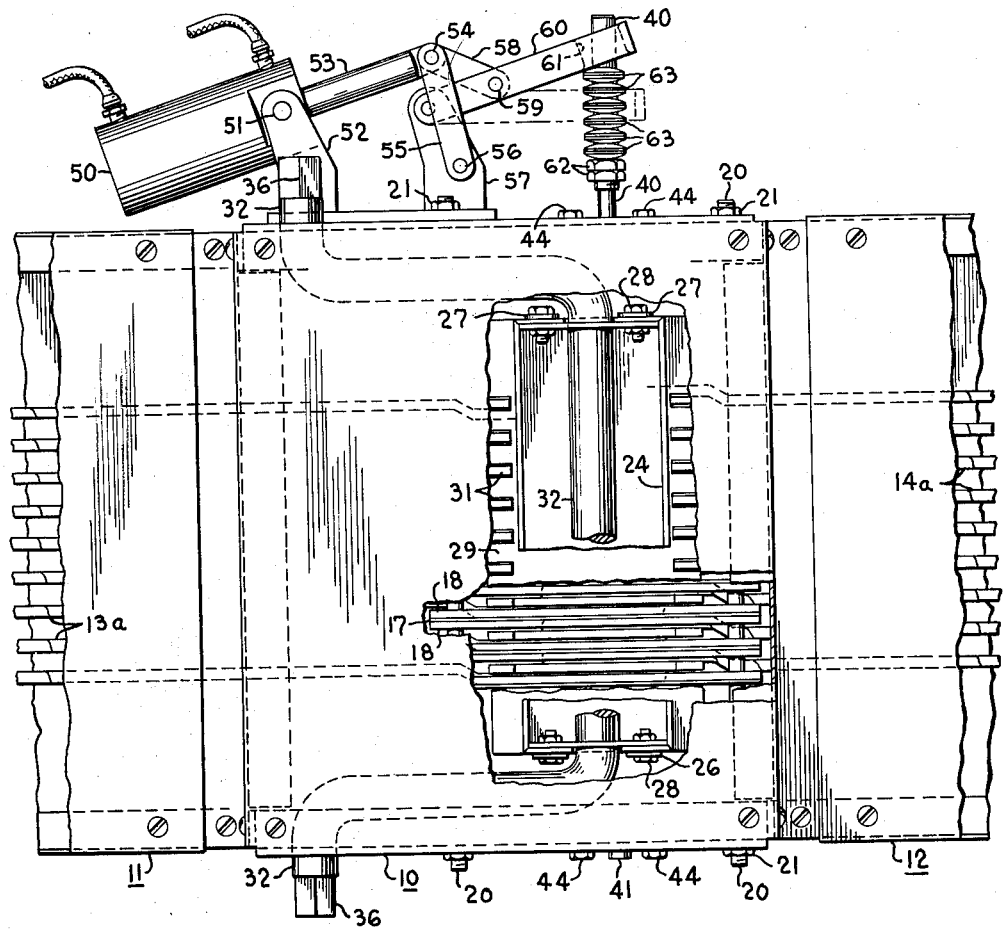

March 20, 1962 — L. E. FISHER — 3,026,396
BUSWAY SWITCH

Filed Sept. 24, 1958 — 3 Sheets-Sheet 3

INVENTOR.
LAWRENCE E. FISHER
BY Robert H. Casey
ATTORNEY

United States Patent Office 3,026,396
Patented Mar. 20, 1962

3,026,396
BUSWAY SWITCH
Lawrence E. Fisher, Southington, Conn., assignor to General Electric Company, a corporation of New York
Filed Sept. 24, 1958, Ser. No. 763,056
5 Claims. (Cl. 200—170)

My invention relates to electric switches and particularly to electric switches of relatively high current-carrying capacity and adapted for use as an integral part of an electric bus bar type power distribution system or busway.

In connection with the utilization of busway systems, it is often necessary to provide means for disconnecting a portion or branch of such a busway system from another portion so as to de-energize the disconnected portion. Since busway systems are ordinarily used to carry relatively high amounts of electric current, such, for example, as 225 to 4000 or more amperes, it has, in the past, been necessary to utilize large, bulky and expensive electric switching apparatus for such applications. Such switches of the conventional type, also, do not lend themselves to ready connection in a busway system but require the use of adaptor connections or stubs, adding further to the cost and difficulty of installation.

It is an object of the present invention to provide a busway switch which is relatively small and compact and is able to carry high values of current without undesirable heating effects.

It is a further object of the invention to provide a busway switch which has its conductors and contacts arranged in a configuration conforming to that of a conventional busway whereby it may be readily connected as an integral part of a busway system without undue difficulty.

It is another object of the invention to provide such a busway switch and means for using a plurality of such switches in combination with a single primary circuit protective device to provide control and protection for a single primary circuit and also for a plurality of secondary circuits deriving their power from the primary circuit.

In accordance with the invention, there is provided a busway switch including an enclosure having two groups of side-by-side parallel bus bar conductors each group terminating in transversely aligned contact portions within the enclosure, with the contact portions of the two groups of bus bars extending into overlapped relation with each other and closely spaced to provide a plurality of pairs of relatively stationary contact portions. A group of bridging contacts is also movably supported within the enclosure, and mechanism is provided for moving the movable contacts between an "on" position in which each of such contacts fills the space between a given pair of overlapped bus bar contacts to interconnect them, and an "off" position in which the movable contacts are moved away from between the bus bar contact portions and in insulating barrier is substituted therefor to electrically separate the contact portions. The invention further comprises mechanism for applying lateral or transverse pressure to the assembly of overlapped busbar contact portions and bridging contacts simultaneously in the "on" condition of the switch.

In accordance with another aspect of the invention, power-operated means is provided for applying such lateral or transverse contact pressure.

In accordance with another aspect of the invention, a plurality of busway switches are provided, each connected in series with one of a plurality of branch circuits or busway "runs" deriving their power in common from a primary circuit or busway. A primary circuit protective device such as a circuit breaker is provided in series with the primary busway and includes a tripping device actuable by remote electrical means. Sensing means is, furthermore, provided associated with the bus bar conductors of each branch busway switch and connected to the tripping device of the circuit breaker so that the occurrence of a predetermined undesired current condition in any one of such branch circuits generates a signal which causes tripping operation of the main protective device.

Other objects of the invention will in part become obvious and in part be specifically pointed out in the following detailed description, and the particular scope of the invention will be pointed out in the appended claims.

In the drawings:

FIGURE 2 is a top plan view of the switch of FIGURE 1;

FIGURE 5 is a fragmentary representation of a modified handle-operating arrangement.

Figure 1:
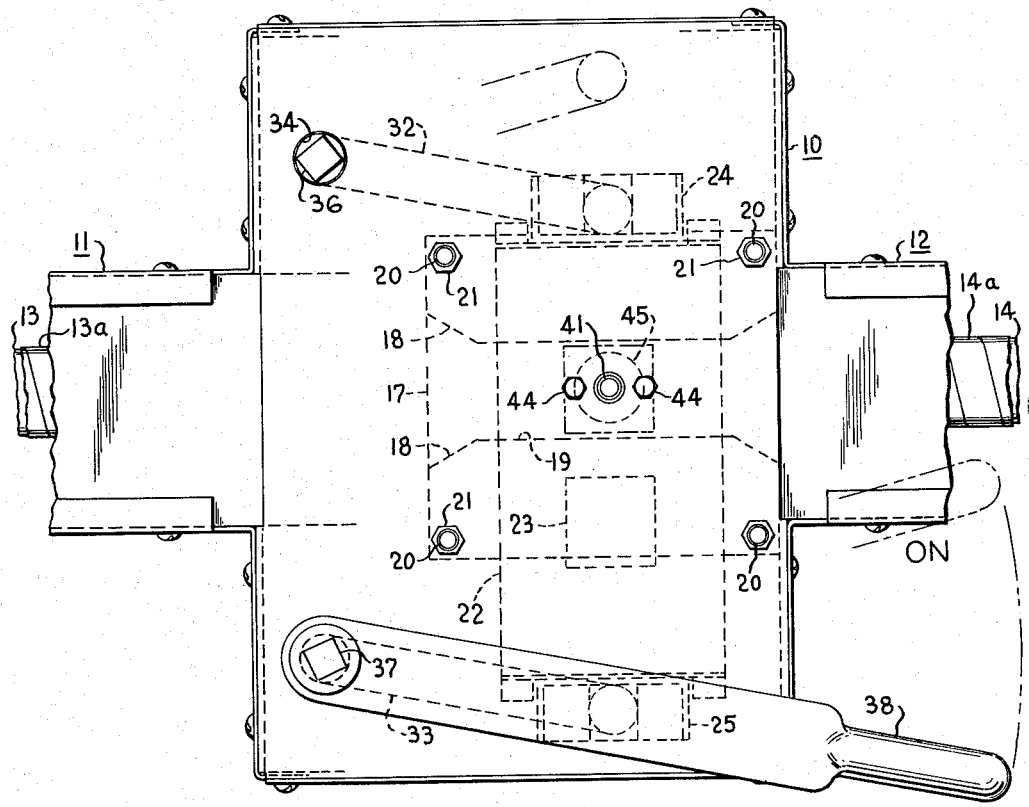
FIGURE 1 is a side elevation view of a busway switch incorporating the invention.

In the drawings, the invention is shown as incorporated is a busway switch having a generally rectangular or box-like main enclosure portion 10 and terminal enclosure portions 11 and 12.

Two sets of parallel bus bars 13 and 14 are supported in side-by-side relation in the enclosure portions 11 and 12, respectively, by suitable insulating supporting means, not shown, such, for example, as disclosed in Patent #2,576,774, E. T. Carlson, assigned to the same assignee as the present invention. The sets of bus bars 13 and 14 have contact end portions 15 and 16, respectively, offset and disposed in overlapped side-by-side alignment generally centrally of the enclosure portion 10. See FIGURES 2 and 3. The major portions of the bus bars 13 and 14 are covered by suitable insulating coating or wrapping 13a and 14a, but the contact portions 15 and 16 are left uninsulated for contact purposes.

Each pair of adjacent overlapped bus bar contact portions 15 and 16 is electrically insulated from the adjacent pair by means of generally rectangular insulating plate assemblies, each such assembly including a generally rectangular central insulating barrier plate 17 having attached thereto, on opposite sides thereof, pairs of insulating spacer plates 18. The spacer plates 18 are spacerd apart at each side of the insulating barrier plate 17 so as to leave a channel or clearance space 19 into which the overlapped busbar contact portions 15 and 16 extend. The insulating plate assemblies comprising the plates 17 and 18 are supported in stationary or fixed relation to the general enclosure 10 by means of a plurality of transversely extending supporting rods 20 attached to the enclosure 10 by suitable means such as by nuts 21. A plurality of movable contact insulating plate members 22 are slidably supported for movement between each respective pair of overlapped contact portions 15 and 16, and carry bridging contact members 23. The contact members 23 are of slightly greater thickness than the insulating carrier plates 22 whereby they make sliding frictional engagement with each of the overlapped contact portions 15 and 16 when in contact-making or "on" position.

The movable contact assemblies, comprising the insulating carrier plates 22 and the bridging contact members 23, are supported for movement in unison in a direction generally perpendicular to the bus bars 13 and 14 by means of a generally rectangular supporting assembly or cage comprising top and bottom supporting members 24 and 25, respectively, extending transversely of the bus bar assembly and interconnected at their respective ends by suitable rigid means such as by pairs of straps 26 and 27, respectively, attached to the top and bottom support members 24 and 25 by suitable means such as by bolts 28. The top and bottom support members 24 and 25 include a bottom plate extended at each side beyond members 24 and 25 to provide flange portions 29 having a series of notches 30 for the purpose of receiving projections 31 of the insulating carrier plates 22, and trapping the insulating plates 22 loosely in position.

The entire assembly of movable contact plates 22 and the supporting frame comprising the top and bottom support members 24 and 25 and the end connecting straps 26 and 27 is movable in a direction generally perpendicular to the bus bars 13 and 14 by means of generally U-shaped crank supporting members 32 and 33. The members 32 and 33 are pivotally supported in the side wall portions of the enclosure 10 in bearings 34 and engage the top and bottom support members 24 and 25 in bearings 35.

The bearings 34 in the enclosure 10 are disposed on a line extending generally perpendicular to the direction of the bus bars 13 and 14. The assembly, comprising the crank arms 32 and 33, the side walls of the enclosure 10, and the connecting straps 26, forms a linkage of the movable parallelogram type, whereby the straps 26 always remain parallel to the line between the fixed pivots 34. The contact carriers 22, therefore, move on a slightly arcuate path, and a slight clearance is therefore provided between the edges of the contact-carrying plates 22 and the rods 20 which support the stationary insulating spacer assemblies 18.

For the purpose of facilitating operation of the movable contact assembly, the crank supports 32 and 33 have the projecting end portions 36 and 37 thereof respectively squared off to receive a suitable crank operating member 38 (see FIG. 1) for facilitating the manual operation of the movable contact assembly. It will be appreciated, of course, that suitable automatic operating means such as a pneumatic cylinder, or fluid operated cylinder, or electric motor operated means may be attached to the ends 36 and 37 for permitting automatic operation of the contact assembly.

For the purpose of providing contact pressure when the movable contact members 23 are in the "on" position, means are provided for compressing all of the overlapped bus bar end contact portions together simultaneously. Such contact pressure means includes a pair of contact pressure-applying rods 40 and 41 disposed on opposite sides of the contact assembly and supported for sliding movement transversely of the bus bar assembly by means of brackets 42 and 43 attached to the side walls of the enclosure 10 by suitable means, such as by bolts 44. Each rod 40 has a generally circular pressure plate 45 at one end, and a compression-type coil spring 46 thereon between the pressure plate 45 and the bracket 42, and a pair of locknuts 47 near the outer end of the rods 40 and 41 serving to limit the travel thereof with respect to the brackets 42 and 43.

The arrangement of the brackets 42 and 43 and the presure rods 40 and 41 together with the coil springs 46 is such as to constantly exert a compressive force in the neighborhood of 15 to 20 pounds transversely of the assembly of bus bar ends at all times. This assists in retaining the switch parts in the "off" position. It is noted at this point, however, that the switch assembly would normally be mounted in a position so that the movement of the movable contact plates 22 would be downardly away from the assembly of bus bars 13 and 14 so that gravity would tend to retain the parts in the open position.

For the purpose of providing the substantially greater force required to maintain the parts of the switch in satisfactory current-carrying condition in the "on" position, power-operated means is provided.

In FIGURE 2 I have shown mechanism for automatically applying contact pressure, comprising a hydraulic cylinder 50 pivotally supported on pivot pin 51 journalled in a bearing meber 52 rigidly mounted upon the exterior of the housing 10, and having an actuating rod 53 projecting therefrom. The actuating rod 53 is pivotally connected at 54 to a radius link 55 having its other end pivotally supported at 56 upon a supporting member 57 also rigidly attached to the housing of the enclosure 10. The rod 53 is also pivotally connected at 54 to an intermediate link 58 which, in turn, is pivotally connected at 59 to an operating arm 60 pivotally supported at one end also on the support member 57. The operating arm 60 has an aperture 61 adjacent the outer end thereof through which the end portion of the pressure rod 40 projects. A pair of stop nuts 62 are mounted on the rod 40 externally of the housing 10, and a number of conical springs or "Belleville" washers are disposed on the rod 40 between the stop nuts 62 and the operating arm 60.

In operation, it will be apparent that as pressure is applied to the actuating rod 53 tending to move it outwardly of the cylinder 50, the link 55 is moved counterclockwise, as is the operating arm 60, exerting compressive pressure on the assembly of conical springs 63. The radius arm 55 forces the pin 54 to move along an arc concentric with the pivot 56 and, therefore, makes possible the application of high positive force even though the hydraulic cylinder 50 is itself pivotally mounted. The conical springs 63 are disposed in multiple or series-parallel relation, that is, they are disposed in pairs with the members of each pair confronting each other in edge-to-edge relation and the pairs themselves being stacked in back-to-back or "nested" relation. This arrangement provides the desired high amount of compressive force with a relatively small amount of total movement. In a particular example, for instance, a pressure of 2000 pounds has been found to be practical and readily maintained by such an arrangement.

In FIGURE 5, I have shown a modified form of pressure-applying means, adapted to be operated manually. In accordance with this form, a bracket 64 is rigidly attached to the outer wall of the housing 10 by suitable means, such as, by bolts 65 and carries an enlarged threaded portion or nut 66 at its intermediate portions faced away from the wall of the enclosure 10. A pressure member 67 is provided with a threaded portion which threadedly engages the nut 66. The inner end of the member 67 has an axial bore or opening 75 adapted to fit loosely over the end of the rod 40 and to bear on the outermost conical spring member 63. The member 67 also includes a squared or non-circular extremity portion by means of which it may be rotated by suitable tool means, not shown, to cause it to move inwardly of the housing 10, applying clamping pressure to the assembly of conical springs 63 and hence to the contact elements.

Figure 3:
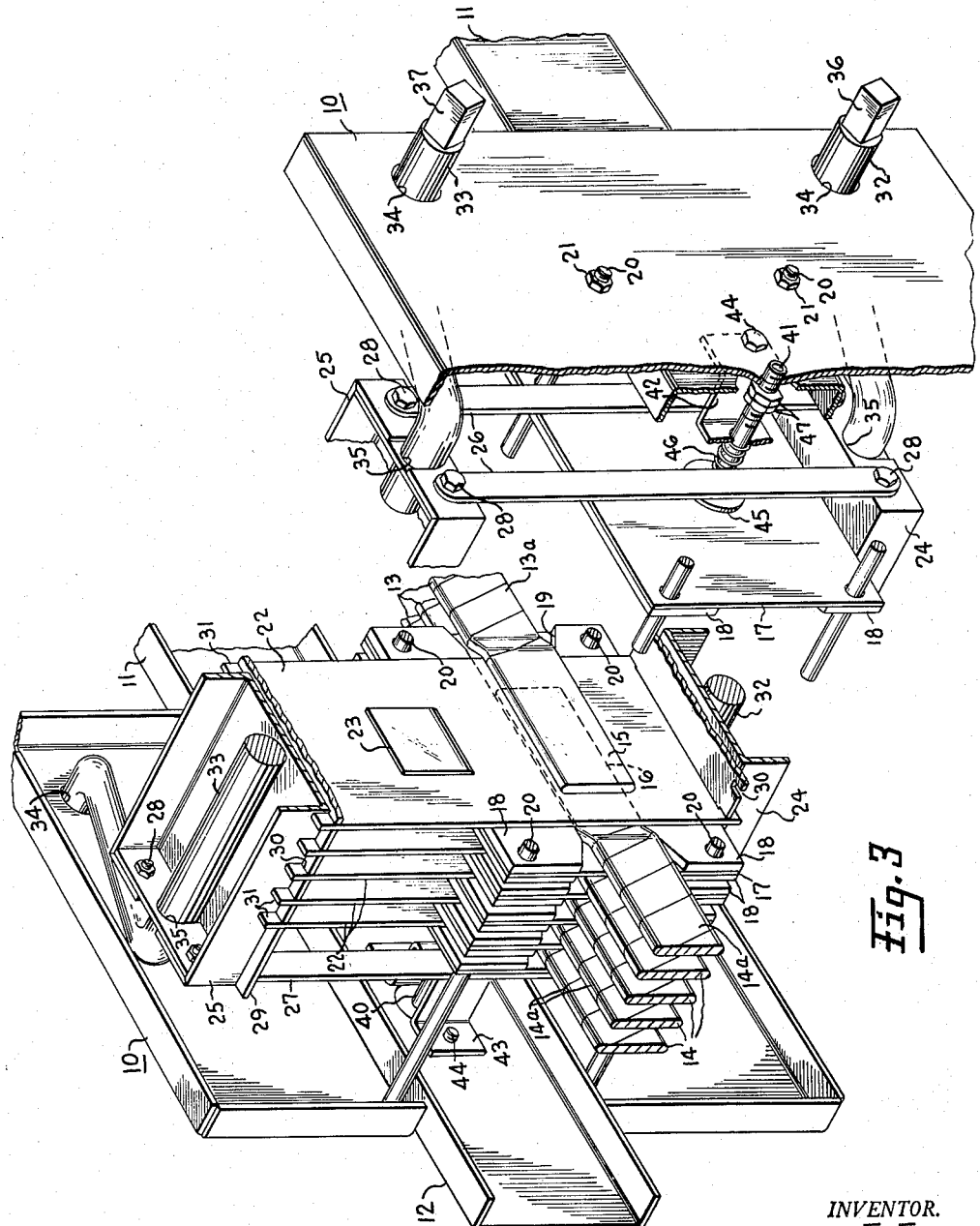
FIGURE 3 is a perspective view of the switch of FIGURE 1, portions thereof being omitted or broken away.

In the specific embodiment of the invention illustrated in FIGURES 1 through 3, there is shown a form of busway switch adapted for use in multiphase circuits, and including a total of nine bus bars or three bars for each electrical phase of a 3-phase system. In such conventional low-impedance busway systems, the bars associated with each of such phases are ordinarily interlaced or interleaved in recurring phase sequence so that no two adjacent bars are energized by the same electrical polarity or phase. This requires that effective insulating means be provided at all times between the exposed contact portions associated with the different phases. It will be observed that the construction described above effectively fulfills this requirement. For example, the bus bars are insulated with a suitable insulating covering 13a and 14a up to a point adjacent the exposed contact areas, and in addition, the stationary insulating barrier plates 17 extending between adjacent contact areas also extend beyond the insulated portions of each of the bus bars and overlap such insulated portions to prevent the existence of any direct through-air path between two energized conductor portions.

Since the contacts, in number and arrangement, correspond to the number and arrangement of the bus bars in the busway system, all the advantages of low reactance and low resistance of such systems are obtained, so that the voltage drop and heat rise within the switch are substantially the same as in a corresponding unbroken section of such busway. A switch constructed in accordance with the illustrated embodiment, for instance, utilizing nine bus bars ¼" x 2" in interlaced relation, with 2000 pounds contact clamping pressure, carried the rated current of the corresponding size busway, i.e., 2000 amperes, with a temperature rise not greater than that existing in an unbroken length of such busway. In another embodiment, a switch including 33 such bars operated without unusual heating while carrying 6500 amperes continuously. This insulating structure provided also serves to confine any arcs down between the movable contacts and the bus bars. The switch referred to, constructed in accordance with the embodiment illustrated, for example, successfully interrupted currents of 5000 amperes in tests.

The overall size of the enclosure of the tested device, constructed in accordance with the illustrated embodiment, was approximately 10 x 12 x 14 inches, whereas the corresponding dimensions of a conventional switch of comparable rating are approximately 35 x 36 x 32 inches. The conventional switch, therefore, occupies a space approximately 25 (twenty-five) times greater. This is, furthermore, exclusive of the additional space and substantial cost required to make connection between busways and such conventional switches.

Figure 4:
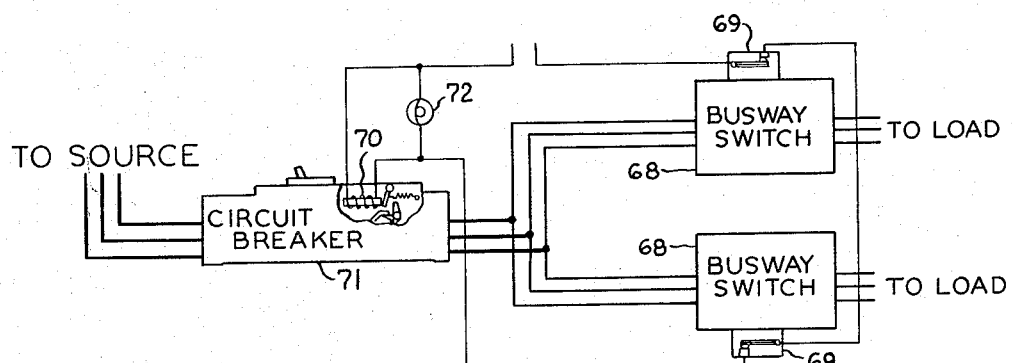
FIGURE 4 is a semi-schematic diagram of the invention as combined with a primary circuit protective device such as a circuit breaker.

In accordance with the form of the invention illustrated in FIGURE 4, a plurality of busway switches 68 are provided, each having a thermostatic switch 69 which is preferably mounted in good thermal conducting relation to the bus bars 13 and 14 within each switch 68. The thermostatic switches 69 are connected in series with each other and to a solenoid type trip-actuating member 70 of conventional construction contained within the conventional circuit breaker 71. The thermostatic switches 69 are so arranged as to be in the normally closed condition and to open upon the occurrence of excessive thermal heating within the respective busway switch 68. Upon the opening of either of the thermostatic switches 69, the solenoid 70 is deenergized, and its spring-actuated plunger moves to cause tripping of the circuit breaker 71. This arrangement also has the advantage that if there should be a failure of the control voltage, the circuit breaker would be tripped, warning of the condition.

A warning light 72 may also be provided, connected in parallel with the solenoid 70. If desired, of course, the user may disconnect the solenoid 70, while leaving the warning light connected, and continue to use the circuit and, at the same time, have a visible indication of the overload condition. Other arrangements may, of course, be used, such as providing normally open thermostatic switches for switches 69, and a solenoid used which includes a plunger arranged to strike the trip member to trip the breaker. The switches 69 would then be connected in parallel.

The advantage of this arrangement is that, by this means, a single protective device, such as circuit breaker 71 can serve to provide overload and short-circuit protection for both the primary or high-current busway run, and each of a number of secondary relatively low-current runs.

Reference has been made to a specific type of busway system, known as "interlaced" systems, in which the bus bars are connected to phases of a multiphase power source in recurring phase sequence so that no two adjacent bars are connected to the same electrical phase. With reference to a multiphase power source having phases A, B, and C, such a system would have the transversely aligned bars connected to the phases so that, reading from one side to the other, the phase relations of the bars at the terminals of the switch are ABCABC, etc. It will be appreciated, of course, that the invention may also be used with other types of systems such as "paired-phase" in which the bars are connected so that the phase identity of the bars is AB—BC—CA—AB, etc., and "laminated" systems in which bars of the same phase identity are grouped together, such as

AAABBBCCC etc.

While only specific embodiments of the invention have been shown, it will be readily apparent that many modifications thereof may be made by those skilled in the art. It is, therefore, intended by the appended claims to cover all such modifications as fall within the true spirit and scope of the invention.

What I claim as new and desire to secure by Letters Patent of the United States is:

1. A multipole electric switch comprising an enclosure, a first set of bus bars disposed in side-by-side parallel relation within said enclosure, a second set of bus bars disposed in side-by-side parallel relation within said enclosure, said first and second sets of bus bars being disposed substantially in axial alignment longitudinally thereof and having overlapped offset exposed contact portions, the remaining portions of such bus bars being covered by insulating material, said bus bars being adapted to carry multipolar currents and adjacent bars of each set being adapted to carry currents of different polarities, a plurality of insulating barriers positioned respectively between adjacent pairs of said overlapped exposed contact portions, a plurality of insulating plates each supported for sliding movement between a respective pair of overlapped contact portions, each of said insulating plates carrying a movable bridging contact, said contact-carrying insulating plates being movable between an "on" position in which each bridging contact is in between and in engagement with a respective pair of overlapped contact portions and an "off" position displaced from said "on" position in which an insulating portion of each plate is between said overlapped contact portions, and means independent of said bridging contacts and said contact portions for applying transverse pressure to the entire assembly of contact portions, insulating barriers and bridging contacts when said plates are in said "on" position.

2. A multipole electric switch comprising an enclosure, a first set of side-by-side bus bars supported in said enclosure, a second set of side-by-side bus bars supported in said enclosure, at least some of the bus bars in each set being insulated from other bus bars in the same set for connection to a multipolar source of electrical power, adjacent bars of each set being adapted to carry currents of different polarities, said first and second sets of bus bars being axially aligned and having exposed contact portions extending in aligned overlapping interlaced side-by-side relation within said enclosure, a plurality of stationary insulating sheet members supported in said enclosure between each adjacent pair of said overlapped contact portions, a plurality of movable insulating sheet members extending between the individual members of each pair of said overlapped contact portions and having a bridging contact member mounted therein, said movable insulating sheet members being movable between a first position in which said bridging contact is positioned between and in engagement with said individual contact portions of each pair of bus bars and a second position in which said bridging contact is displaced from said first position out of engagement with said individual contact portions, said contact carrier members when in said second position having a portion thereof extending between said contact portions and overlapping said insulating portion of said bus bars, and clamping means operable when said movable insulating sheet members are in said first position for applying a clamping force from side to side of the entire assembly of bus bar contact portions to compress said contact portions, said stationary insulating sheet members, and said bridging contact members into firm engagement.

3. A multipole electric switch comprising an enclosure of generally rectangular construction and a pair of enclosure portions of duct-like construction, a plurality of side-by-side insulated electric power bus bars supported in each of said duct-like enclosure portions, at least some of the bus bars in each enclosure portion being insulated from others in the same enclosure portion to adapt said bus bars to carry multipolar electric currents, the bus bars in each enclosure portion having exposed contact portions overlapping corresponding exposed contact portions of the bus bars in the other enclosure portion, all of said overlapping contact portions being arranged in a single row in transverse alignment within said first enclosure portion, the bars in said enclosure portions being axially aligned and adjacent bars in each enclosure portion being adapted to carry currents of different polarities, a plurality of sheet insulating members supported in said first enclosure portion, each of said insulating members extending between respectively adjacent pairs of said overlapped contact portions, a plurality of movable insulating contact carrier members between the individual contact portions of each pair of overlapped contact portions, said insulating contact carrier members being supported for movement generally perpendicular to said bus bar conductors and carrying bridging contact members and movable between an "on" position in which each of said bridging contact members is located between a respective pair of exposed contact portions, and an "off" position displaced from said "on" position, and independently operable means for applying transverse clamping pressure to the assembly of bus bar contact portions, sheet insulating members, and bridging contact members simultaneously.

4. A multipole electric power busway switch comprising an enclosure of generally rectangular configuration and a pair of enclosure portions of generally duct-like construction, a pair of sets of side-by-side mutually insulated parallel bus bars each set supported in a respective one of said duct-like sections and including exposed contact terminal portions offset and disposed in side-by-side overlapped relation with corresponding terminal portions of the other set of bus bars, all of said terminal portions being arranged in a row within said enclosure, a plurality of insulating barrier members extending between adjacent pairs of said overlapped bus bar terminal portions and each including a channel-like recess for receiving said terminal portions of said bus bars and supporting said terminal portions, a plurality of contact carrier members of sheet insulating material slidably supported between the individual members of each respective pair of overlapped terminal portions, each of said carrier members having a bridging contact thereon for engagement with one pair of said exposed overlapped terminal portions of said bus bars, means connecting said insulating carrier members rigidly together, means for moving said assembly of insulating carrier members in unison comprising a pair of links at each side of said assembly pivotally connected between said assembly and said enclosure, said links extending parallel to each other, and means for rotating said links about their pivotal support on said enclosure, and independently actuable means for applying transverse clamping pressure to said terminal portions said barrier members, and said bridging contacts.

5. A multipole electric power busway switch comprising an enclosure of generally rectangular configuration and a pair of enclosure portions of generally duct-like construction, two sets of side-by-side mutually insulated parallel busbars with each set supported in a respective one of said duct-like sections, the two sets of bars being axially aligned and including exposed contact terminal portions in overlapped relation and arranged in a row within said enclosure, said bus bars being adapted to carry multipolar currents and adjacent bars of each set being adapted to carry currents of different polarities, a plurality of insulating barrier members extending between adjacent pairs of said overlapped contact portions, a plurality of contact carrier members of sheet insulating material slidably supported between the individual members of each pair of said overlapped contact portions, each of said carrier members having a bridging contact thereon for engagement with the members of a separate pair of said exposed overlapped contact portions, means connecting said carrier members together, means for moving said connected carrier members in unison comprising a pair of links at each side of said assembly pivotally connected between the assembly and said enclosure, said links extending parallel to each other, and means for rotating the links about their pivotal support on said enclosure, and actuable means for applying transverse clamping pressure to said row of terminal portions, said barrier members, and said bridging contacts.

References Cited in the file of this patent
UNITED STATES PATENTS

| | | |
|---|---|---|
| 1,856,254 | Jewett | May 3, 1932 |
| 1,913,309 | Kutschke et al. | June 6, 1933 |
| 1,917,009 | Betts et al. | July 4, 1933 |
| 2,005,685 | Sachs | June 18, 1935 |
| 2,247,088 | Hill | June 24, 1941 |
| 2,260,641 | Reid | Oct. 28, 1941 |
| 2,607,831 | Jones | Aug. 19, 1952 |
| 2,758,255 | Lytle | Aug. 7, 1956 |
| 2,765,380 | Graybill | Oct. 2, 1956 |